United States Patent [19]
Seidl et al.

[11] Patent Number: 5,120,814
[45] Date of Patent: Jun. 9, 1992

[54] METHOD OF PRODUCING NEW FLAME-RETARDANT THERMOSTABLE HOMOPOLYIMIDES, THESE HOMOPOLYIMIDES, A MOULDED ARTICLE OBTAINED THEREFROM AND A FIBRE PROUCED FROM THESE HOMOPOLYIMIDES

[75] Inventors: Sigrid Seidl, Seewalchen; Klaus Weinrotter; Herbert Griesser, both of Vöcklabruck, all of Austria

[73] Assignee: Lenzing AG, Lenzing, Austria

[21] Appl. No.: 473,305

[22] Filed: Jan. 31, 1990

[30] Foreign Application Priority Data

Feb. 15, 1989 [AT] Austria ............... 336/89

[51] Int. Cl.$^5$ ............................. C08G 18/22
[52] U.S. Cl. ............... 528/57; 528/51; 528/52; 528/73; 528/223; 528/224; 528/229; 528/350; 528/351; 528/353; 264/331.16
[58] Field of Search ............ 528/51, 52, 57, 73, 528/223, 224, 229, 350, 351, 353; 264/331.16

[56] References Cited

U.S. PATENT DOCUMENTS

| | | | |
|---|---|---|---|
| Re. 31,805 | 1/1985 | Takekoshi | 528/351 |
| 4,001,186 | 1/1977 | Onder | 524/727 |
| 4,021,412 | 5/1977 | Onder | 528/52 |
| 4,156,065 | 5/1979 | Onder | 528/51 |

Primary Examiner—Maurice J. Welsh
Assistant Examiner—Rachel Johnson
Attorney, Agent, or Firm—Kenyon & Kenyon

[57] ABSTRACT

To produce flame-retardant thermostable new homopolyimides having structural units of the general formula

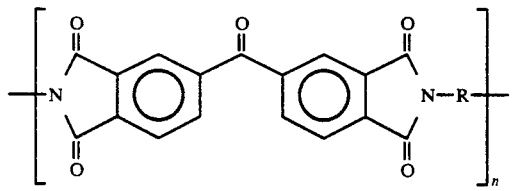

by reacting 3,3',4,4'-benzophenone tetracarboxylic acid dianhydride with an overall equimolar amount of 2,4- and/or 2,6-toluene diisocyanate, the reaction is carried out in the presence of a polymerization accelerator. The new homopolyimides have a glass transition point of at least 320° C. and are processible to moulded articles exhibiting a similarly good structural strength as could hitherto be observed in mixed polyimides only. Furthermore, the new homopolyimides can be spun to fibres.

1 Claim, No Drawings

METHOD OF PRODUCING NEW FLAME-RETARDANT THERMOSTABLE HOMOPOLYIMIDES, THESE HOMOPOLYIMIDES, A MOULDED ARTICLE OBTAINED THEREFROM AND A FIBRE PROUCED FROM THESE HOMOPOLYIMIDES

The invention relates to a method of producing new flame retardant thermostable homopolyimides having structural units of the general formula

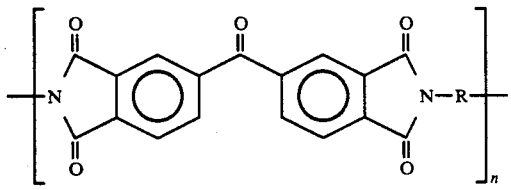

wherein n is an integer larger than 1 and R represents a group of the formula(s)

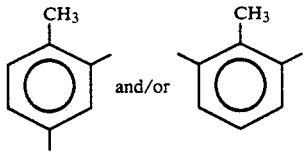

by reacting 3,3',4,4'-benzophenone tetracarboxylic acid dianhydride with an overall equimolar amount of 2,4- and/or 2,6-toluene diisocyanate, as well as to moulded articles and fibres produced from these homopolyimides.

The production of a heat-resistant polyimide from 3,3',4,4'-benzophenone tetracarboxylic acid dianhydride (BTDA) and 4,4'-methylene-bis-(phenyl isocyanate) (MDI) has been known for some time. This polyimide exhibits a good structural strength but has a relatively low glass transition point which negatively affects its structural strength at higher temperatures. Furthermore, at higher temperatures it is difficult to press this polyimide to moulded articles.

From DE-C-21 43 080 it is known that the abovementioned disadvantages can be eliminated if a certain portion of recurring units of a second polyimide is incorporated into the former polyimide by replacing a part of the MDI by toluene diisocyanate (TDI), thus forming a mixed polyimide.

For an even better thermostability a complete exchange of the MDI would be desirable, since in that case the polyimide molecule would no longer contain any oxidation-sensitive methylene groups. From example 5 of DE-C-21 43 080 it is, however, known that such a homopolyimide, made of BTDA and TDI only, has a poor structural strength. Moulded articles made by hot pressing such a homopolyimide powder have a poor tensile strength, elongation, and a poor modulus, compared to moulded articles produced from mixed polyimides. Furthermore, their field of application is additionally limited because the homopolyimide mentioned cannot be processed to fibres. Only their glass transition temperature lying at 315° C. is just as high as that of the mixed polyimides.

For all these reasons a homopolyimide produceable from BTDA and TDI has not been considered to be an interesting material, so that in the further development attempts have been made to optimize the production of mixed polyimides by the addition of polymerisation accelerators.

U.S. Pat. No. 4,021,412, e.g., discloses that alkali metal lactamates catalyse the formation of some mixed polyimides. MDI and TDI are mentioned as diisocyanate components. U.S. Pat. No. 4,156,065 teaches that certain four or five-membered cyclic phosphor compounds also have a catalytic effect on the formation of the MDI/TDI mixed polyimides.

According to U.S. Pat. No. 4,001,186 also alkali metal alcoholates are suitable as polymerization accelerators. It is mentioned there that these substances not only permit the carrying out of a reaction at a lower temperature but also suppress undesired side reactions.

The invention has as its object to provide a method of producing new homopolyimides having structural units of the initially defined kind, which do not have the above-mentioned disadvantages of the known homopolyimides and thus are particularly processible to fibres and moulded articles whose structural strength is about as good as that of mixed polyimides, wherein the thermostability of these new homopolyimides is not reduced as compared to mixed polyimides.

According to the invention, this object is achieved in that the reaction of 3,3',4,4'-benzophenone tetracarboxylic acid dianhydride with toluene diisocyanate, which is known per se, is carried out in the presence of a polymerization accelerator.

It has been found that polymerization in the presence of a polymerization accelerator not only proceeds faster, but also leads to new homopolyimides of a higher molecular weight. When carrying out the reaction without a polymerization accelerator, the longer reaction times required apparently promote undesired side reactions leading to the incorporation of by-products in the polyimide chain. It is assumed that there is a causal connection between these side reactions and the poor structural strength of the known homopolyimide.

As the polymerization accelerators, alkali metal alcoholates, phospholene, phospholane or phosphetane derivatives, in particular a mixture of 1,3-dimethyl-2-phospholene-1-oxide and 1,3-dimethyl-3-phospholene-1-oxide, and alkali metal lactamates have proved to be particularly effective.

A further embodiment of the method according to the invention consists in that 2,4 and/or 2,6-toluene diamine are used instead of the toluene diisocyanate.

Advantageously the polymerization accelerator is used in an amount of from 0.1 to 100 mmole per mole of toluene diisocyanate or toluene diamine, respectively.

When using toluene diisocyanate, the method according to the invention is best carried out in a dipolar aprotic solvent at a temperature between 50° and 120° C., preferably between 70° and 100° C. As the solvent, e.g. dimethyl formamide, dimethyl sulfoxide, dimethyl acetamide, N-methyl-2-pyrrolidone, tetramethyl urea and hexamethyl phosphoric acid are suitable. When using toluene diamine, it is operated in an inert organic solvent. The amount of solvent should be selected such that the final polyimide solution has a polyimide content of between 15 and 40 by weight.

The course of the reaction can be followed very well by IR spectroscopy, and it has proved to be favorable if the reaction is stopped immediately after the disappearance of the IR-spectroscopically observable anhydride absorption or NCO absorption.

Since $CO_2$ is split off during the reaction, the course of the poly-condensation can also be observed by the gas development.

When the reaction has finished, a viscous solution is obtained, from which the new homopolyimides can be precipitated by acetone, tetrahydrofurane or isopropyl alcohol. These new homopolyimides have a glass transition point of at least 320° C.

The high glass transition point already indicates the excellent thermal properties of the homopolyimides according to the invention. Their thermostability is even higher than that of the known mixed polyimides produced from BTDA and TDI/MDI mixtures or that of the known homopolyimides.

The invention also relates to moulded articles which ca be produced from the homopolyimides by hot pressing. They have an LOI-value (limited oxygen index) of between 36 and 41 and their structural strength is practically as good as that of moulded articles produced from mixed polyimides.

The above-mentioned viscous solution of the homopolyimides according to the invention furthermore can be processed directly to fibres, wherein e.g. the dry spinning method disclosed in AT-B-377.016 may be used.

After a duration time of 1000 hours at 250° C. the fibres according to the invention have a residual strength of at least 70%. Even after heating to 450° C. for three hours their weight loss is only 40% at the most.

The invention will be explained in more detail by way of the following exemplary embodiments, wherein in Example 1 the production of the homopolyimides according to the invention as well as their processing to test bars, and in Example 2 the processing of a solution of the homopolyimides of the invention to fibres is disclosed. To document the effect of the polymerization accelerator used according to the invention, both Examples were also carried out without the addition of the polymerization accelerator, and the results are given in the tables of the respective Comparative Examples 1 and 2.

EXAMPLE 1

In a 1000 ml flask equipped with a stirrer, a reflux condenser, a thermometer and with nitrogen flushing, 161 g (0.5 mole) of benzophenone-3,3',4,4'-tetracarboxylic acid dianhydride and 0.2 g (0.005 mole) sodium methylate were dissolved in 816 g of dry DMF. The reaction mixture was heated to 80° C., and 87 g (0.5 mole) toluene diisocyanate (2,4- and/or 2,6-isomere) were added dropwise within four hours under constant stirring and under nitrogen atmosphere. The polycondensation solution was then further stirred for one hour at 80° C. until the development of $CO_2$ stopped.

The reaction was stopped very quickly as soon as no free anhydride or isocyanate groups could be detected by IR spectroscopy.

The finished polycondensation solution had an inherent viscosity (c=0.25 g/dl at 25° C. in DMF/1% LiBr) of 48 ml/g. By adding acetone the polyimide was precipitated, the precipitate was filtered off, washed and dried. The yield was 96% of theory. The glass transition point of the powder was 325° C.

From the polyimide powder, test bars having a size of 120×15×5 mm were produced by hot-pressing. A 30 ton press equipped with a set of 300×300 mm heated pressure platens was used. In Table 1 (left-hand column) the pressing conditions and the physical properties of the test rods produced from the homopolyimide according to the invention are summarized.

For reasons of comparison, test bars were pressed from a mixed polyimide (BTDA+80% TDI+20% MDI), the production of which is disclosed in U.S. Pat. No. 3,708,458. The test results are given in the right-hand column of Table 1, and it is apparent that the mixed polyimide has a significantly lower glass transition point (TG) and that the structural strength of the test bar produced from the homopolyimide according to the invention is as good as that of the test bar produced from the mixed polyimide.

TABLE 1

|  | Test bar of homo-polyimide (BTDA + TDI) | Test bar of mixed polyimide (BTDA + 80% TDI + 20% MDI) |
|---|---|---|
| Pressing conditions |  |  |
| weight | 4.5 g | 4.5 g |
| temperature of the pressure platen | 340° C. | 340° C. |
| pre-heating time | 2 min | 2 min |
| pressing force | 350 kg/cm² | 350 kg/cm² |
| time during which the test bar is kept at pressing temperature | 20 min | 20 min |
| temperature after 15 min of cooling | 260° C. | 260° C. |
| quality | in order | in order |
| Properties |  |  |
| bending strength DIN 53 452 | 165 N/mm² | 165 N/mm² |
| modulus | 3800 N/mm² | 3800 N/mm² |
| bending strain DIN 534 550 | 5.5% | 5.5% |
| number of pressed bodies | 5 | 5 |
| LOI | 36–41 | 36–38 |
| TG *1 | 325° C. | 315° C. |

*1 measured with a thermal analysis device of Perkin Elmer by means of differential scanning calorimetry (DSC 4) in $N_2$-atmosphere, heating rate 20° C./min

COMPARATIVE EXAMPLE 1

In a 1000 ml flask equipped with a stirrer, a reflux condenser, a thermometer and with nitrogen flushing, 161 g (0.5 mole) of benzophenone-3,3'-4,4'-tetracarboxylic acid dianhydride were dissolved in 816 g of dry DMF. The solution was heated to 80° C., and 87 g (0,5 mole) of toluene diisocyanate (2,4- and/or 2,6-isomer) were added dropwise within four hours under constant stirring and under nitrogen atmosphere. Subsequently the polycondensation solution had to be further stirred for 3 hours at 80° C., since after a further stirring time of one hour free isocyanate groups could still be detected in the IR spectrum.

The finished polycondensation solution had an inherent viscosity (c=0.25 g/dl at 25° C. in DMF/1% LiBr) of 35 ml/g. By adding acetone the polyimide was precipitated, and the precipitate was filtered off, washed and dried. The yield was 74% of theory.

From the polyimide powder test bars having a size of 120×15×5 mm were produced by hot pressing. The hydraulic 30 ton press used was equipped with a set of 300×300 mm heated pressure platens.

In Table 2 the pressing conditions and the physical properties of the test bars are summarized.

TABLE 2

| Pressing conditions | |
| --- | --- |
| weight | 4,5 g |
| temperature of pressure platen | 340° C. |
| pre-heating time | 2 min |
| pressing force | 350 kg/cm² |
| time during which the test bar is kept at pressing temperature | 20 min |
| temperature after 15 min of cooling | 260° C. |
| quality | poor |
| Properties | |
| bending strength DIN 53 452 | 85 N/mm² |
| modulus | 3230 N/mm² |
| bending strain DIN 534 550 | 3% |
| number of pressed bodies | 5 |
| LOI | 36–38 |
| TG *1 | 315° C. |

*1 as above

EXAMPLE 2

In a reaction vessel made of special steel and equipped with a stirrer, a reflux condensor, a thermosensor and with nitrogen flushing, 5928 g (18.4 moles) of benzophenone-3,3',4,4'-tetracarboxylic acid dianhydride and 7.5 g (0.19 mole) sodium methylate were dissolved in 22500 g of dry DMF. The reaction mixture was heated to 80° C., and 3204 g (18.4 moles) of toluene diisocyanate (2,4- and/or 2,6-isomer) were added dropwise within six hours under constant stirring and under a nitrogen atmosphere. The increase in the viscosity of the solution was observed via an in-line viscosimeter. When the total amount of the diisocyanate had been added, stirring was continued at 80° C. for one hour until the $CO_2$ development ceased. Then no free anhydride or isocyanate groups could be detected any longer in the IR spectrum.

The finished polycondensation solution had an inherent viscosity (c=0.25 g/dl at 25° C. in DMF/1 % LiBr) of 46 to 52 ml/g. From this polycondensation solution, fibres were produced according to the dry spinning method disclosed in AT-B-377.016. The properties of the polytoluylene benzophenone tetracarboxylic acid imide fibre are illustrated in Table 3, compared with a mixed polyimide fibre (BTDA+80% TDI+20% MDI) produced in accordance with the same dry spinning method.

TABLE 3

| | Fibre of homopolyimide (BTDA + TDI) | Fibre of mixed polyimide (BTDA + 80% TDI + 20% MDI) |
| --- | --- | --- |
| fibre titre | 2.2 dtex | 2.2 dtex |
| strength | 30 cN/tex | 30 cN/tex |
| elongation | 25–30% | 25–30% |
| residual strength after 1000 h at 250° C. in air *2 | 70% | 50% |
| weight loss after 3 h at 450° C. in air | 40% | 60% |
| LOI | 36–41 | 36–38 |
| TG *1 | 325° C. | 315° C. |

*1 as above
*2 measured with a thermal analysis device of Perkin Elmer by means of thermogravimetric analysis (TGS 2) in air.

COMPARATIVE EXAMPLE 2

In a reaction vessel made of special steel equipped with a stirrer, a reflux condensor, a thermosensor and with nitrogen flushing, 5928 g (18.4 moles) of benzophenone-3,3',4,4'-tetracarboxylic acid dianhydride were dissolved in 22500 g of dry DMF. The reaction mixture was heated to 80° C., and 3204 g (18.4 moles) of toluene diisocyanate (2,4 and/or 2,6-isomer) were added dropwise within six hours under constant stirring and under a nitrogen atmosphere. The increase in the viscosity of the solution was observed via an in-line viscosimeter. After the addition of the entire amount of diisocyanate stirring had to be continued at 80° C. for 5 hours, until no isocyanate groups could be detected in the IR spectrum any longer. The finished polycondensation solution had an inherent viscosity (c=0.25 g/dl at 25° C. in DMF/1% LiBr) of 34 to 38 ml/g. From this polycondensation solution fibres were produced according to the spinning method disclosed in AT-B-377.016. The properties of these polytoluylene benzophenone tetracarboxylic acid imide fibres are illustrated in Table 4.

TABLE 4

| | |
| --- | --- |
| final fibre titre | 2.2 dtex |
| strength | 25 cN/tex |
| elongation | 23–28% |
| residual strength after 1000 h at 250° C. in air *2 | 50% |
| weight loss after 3 h at 450° C. in air | 60% |
| LOI | 36–38 |
| TG *1 | 315° C. |

*1 as above
*2 as above

What we claim is:

1. A method of producing new flame retardant thermostable homopolyimides comprising the reaction of 3,3',4,4'-benzophenone tetracarboxylic acid dianhydride with toluene diisocyanate in the presence of a sodium methylate polymerization accelerator effective to produce a homopolyimide containing toluene diisocyanate residues which homopolyimide has a structural strength comparable to the structural strength of polyimides containing residues derived from diisocyanates other than toluene diisocyanate.

* * * * *